Figure 1:
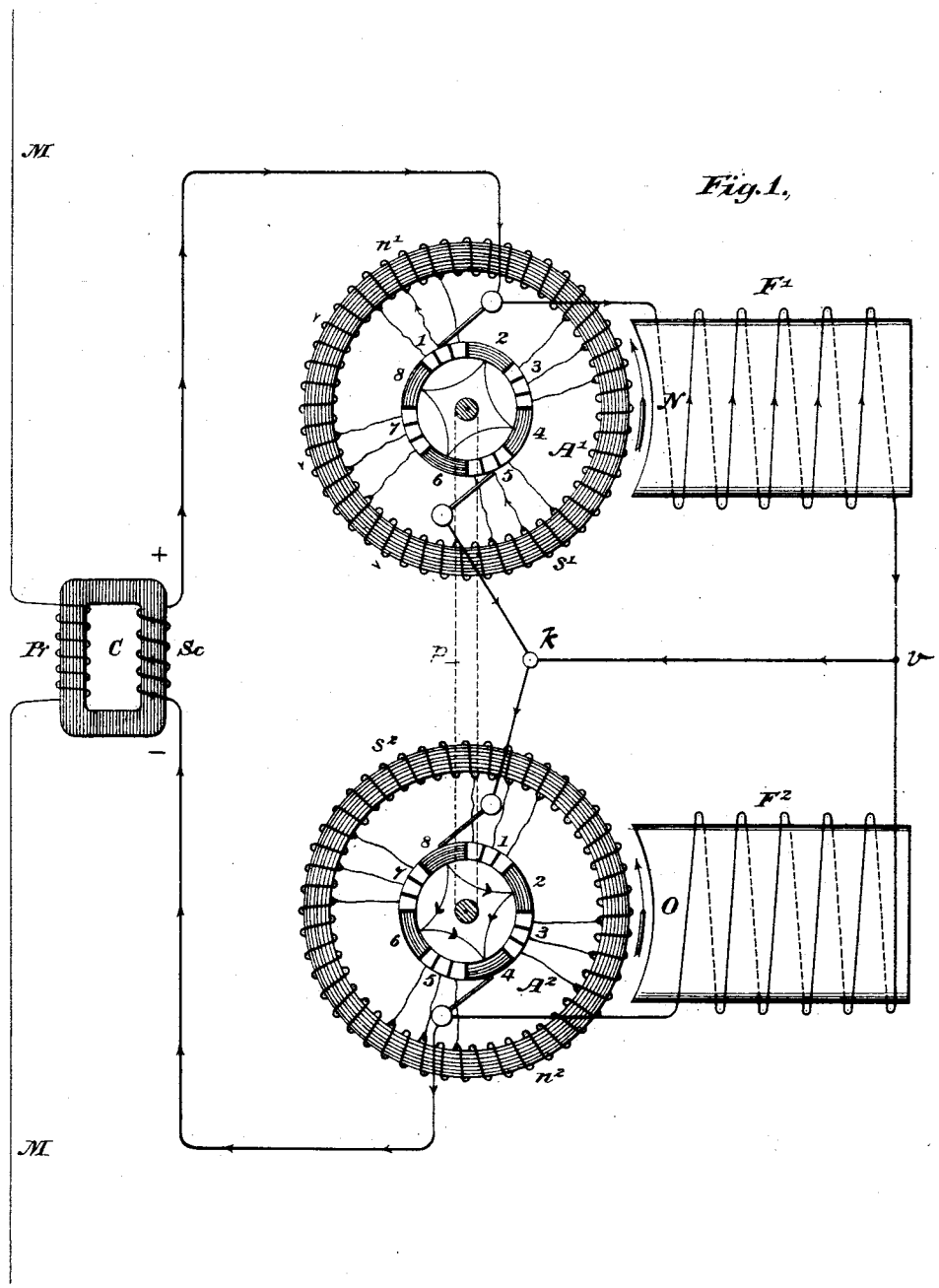

(No Model.) 2 Sheets—Sheet 1.

F. J. PATTEN.
ELECTRIC MOTOR.

No. 445,624. Patented Feb. 3, 1891.

Witnesses
J. F. Reynolds
A. V. Heney

Inventor
Francis Jarvis Patten
By Attorney
Charles J. Kintner

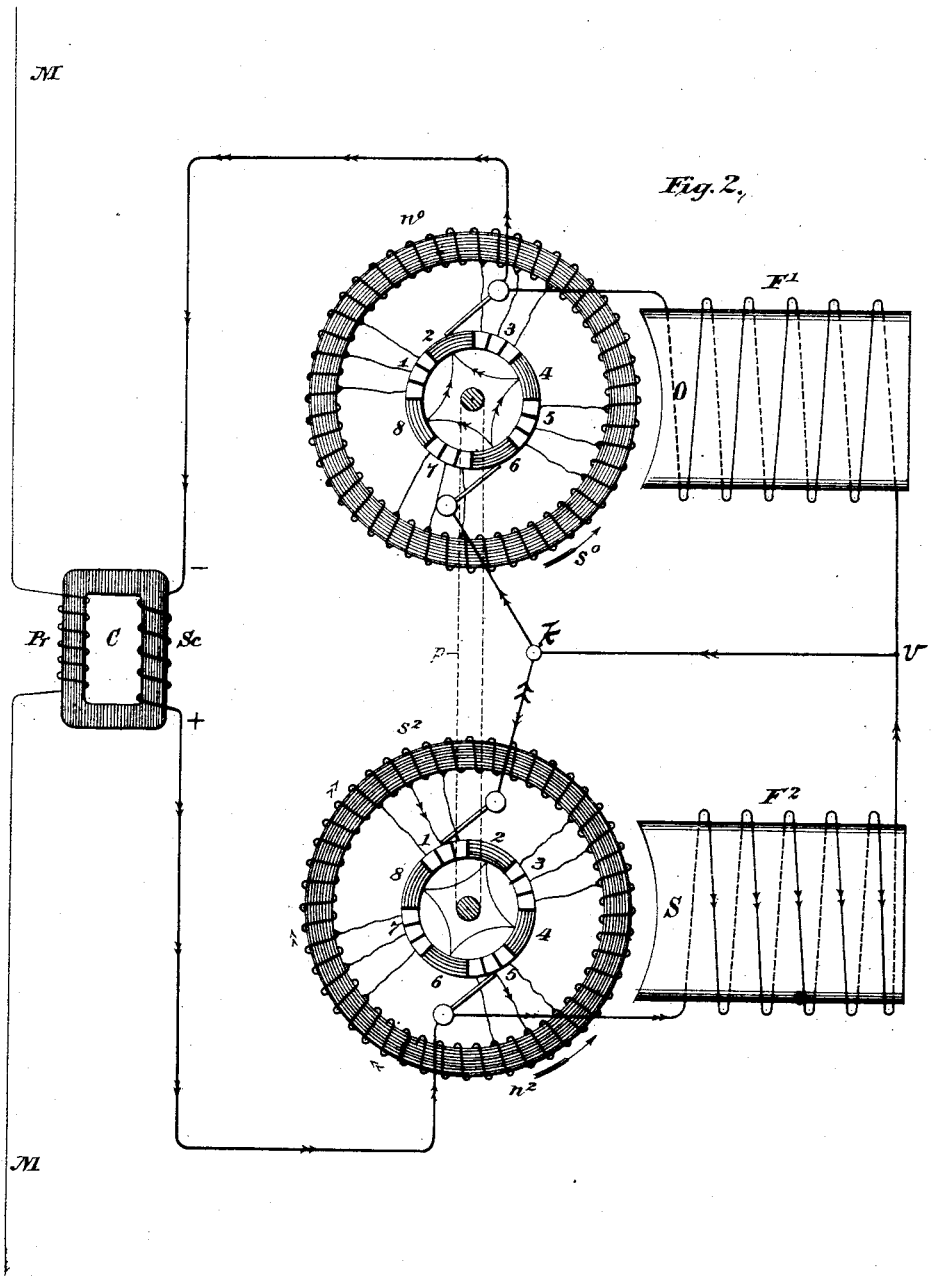

UNITED STATES PATENT OFFICE.

FRANCIS JARVIS PATTEN, OF NEW YORK, N. Y., ASSIGNOR, BY MESNE ASSIGNMENTS, TO THE PATTEN ALTERNATING MOTOR COMPANY, OF NEW JERSEY.

ELECTRIC MOTOR.

SPECIFICATION forming part of Letters Patent No. 445,624, dated February 3, 1891.

Application filed October 18, 1890. Serial No. 368,519. (No model.)

*To all whom it may concern:*

Be it known that I, FRANCIS JARVIS PATTEN, a citizen of the United States, residing at New York, county of New York, and State of New York, have made a new and useful invention in Electric Motors, of which the following is a specification.

My invention consists in a novel form of electric motor for alternate-current systems of electric distribution, by which, owing to the peculiar system of connecting its various circuits, results are obtained which could not otherwise be secured.

In the drawings, Figures 1 and 2, which are apparently identical, show the operative parts and circuits of the motor in two successive positions of the armature. A description of the circuits in Fig. 1 will therefore answer for both.

In a former application, Serial No. 367,188, filed October 6, 1890, I have shown a machine somewhat similar to the one shown in this application, with the exception that in the former application a machine was shown that was operated by two independent sources of energy. The present machine is an improved modification of the plan shown in the application referred to. The motor shown in the present application has, however, some special characteristics in the way of combination of circuits used that render it essentially different as a system of operative electrical circuits from the machine described in the former application referred to.

Referring to Fig. 1, C is a converter of alternate current, and $Pr$ is the primary and $Sc$ the secondary circuit of the transformer. There are two independent armature-windings to the machine, each having its own commutator or collector, and there are also two separate field-magnet circuits, and the circuits of each machine, separately considered, are so arranged with respect to each other that each receives the current in turn while the other is cut out. The two armature-windings might for all practical purposes be placed upon the same armature-core, with separate commutators and brushes for each arranged as shown. The machine, however, will be better understood and easier described by the representation given, in which the windings of both field-magnets and armatures are indicated upon separate cores. Only one pole of each is shown, as it is evidently unnecessary in order to describe the system of circuits used to show both.

In Fig. 1 we find represented two independent Gramme rings $A'$ $A^2$, each having its own field or independent magnetic circuit $F'$ $F^2$. Referring first to the rings, they are both supplied with commutators arranged in alternate groups of segments, the odd-numbered groups 1, 3, 5, and 7 in each being divided into segments connected to the ring-winding in the ordinary way. The intermediate portions are uncut, not divided into segments, and in both commutators these segments are all connected together as one. The brushes resting on both these commutators are placed so that their points bear upon the same line parallel to the spindle to which both armatures are secured. It only remains to explain that these rings and their armatures are so placed upon the common spindle that when the brushes, placed in the position described, bear upon connecting-segments in one armature they bear upon the intermediate disconnected segments in the other, and it therefore results from this combination of these elements that one armature will be in circuit operatively while the other is short-circuited by the connected segments, or cut out of circuit during the time that the first is operative and is receiving current in the usual way.

Fig. 1 shows the upper machine, armature, and field-magnet, operative with respect to a plus (+) or positive current from the converter's secondary, (indicated in direction by the single arrow-heads,) while the lower machine or separate armature and field-magnet is short-circuited or cut out by reason of the brushes in this machine bearing upon the disconnected segments, which carry the current for the time being directly from one brush to the other, and so leave out of circuit the armature-winding and the field-magnet $F^2$. The circuits will be readily seen by following the single arrows in Fig. 1. The current is supposed to start from the pole of the secondary marked plus, (+,) going to the upper brush of the armature A', thence through the armature-circuit to the lower brush of this armature, and also in derivation as a shunt-current through the field-magnet F' and back to a point marked $k$, where it again joins the current coming from the lower brush of the armature, thence from the point $k$ to the upper brush of the lower armature, which for the time being is in contact with the even-numbered segments 8 2 4, all connected together, which allows the current to pass directly from the upper to the lower brush of this armature without going through the armature-circuit, also cutting out the field-circuit $F^2$ of this armature back to the negative pole of the converter, marked minus, (−.)

It will be seen from examination of Fig. 1 that the armature A' and its field F' are momentarily operated under the action of the current in the ordinary way, and whether the current is alternating or not the tendency to rotation in the upper armature with respect to its field-magnet F' will be in the direction of the arrow, as shown, and motion will ensue. As the armatures turn upon the common spindle (shown dotted,) they are eventually brought to the position shown in Fig. 2, in which the upper machine, having its brushes on the disconnected segments, is now cut out of circuit and is not operative, while the lower machine has come into a position where both its circuits, field, and armature are in operation. This corresponds to the time period of a negative or minus (−) impulse, and these two phases of current (indicated in Fig. 1 by the single arrows and in Fig. 2 by the double arrows indicating a reversed current) operate successively the two parts, as shown, each in succession, one field and armature being operative, while the other for the time being is cut out of circuit, and each for the time being acts as an independent direct-current machine.

The wire from K to V, common to both field-magnet circuits in shunt relation to their respective armatures, is one of the effective and essential features of this system of motor-circuits. It amounts, in fact, to an application of the divided three-wire system to the internal circuits of a motor. The armatures are connected in series relation to each other, the fields in shunt relation to their respective armatures, and each in turn made operative as the other is short-circuited. It will be seen upon examination of the circuits that the converter secondary Sc is therefore always working through the same resistance as each machine in turn is cut into its circuit, while the field-magnets, after synchronous motion has been obtained, retain a constant polarity by reason of the fact that each gets in turn a succession of positive or negative impulses, and the same remark applies to the armature-circuits.

Reference has only been made to a machine having a Gramme-ring armature; but evidently the same arrangement of circuits will be equally operative with any style of armature, provided the two machines are connected in the manner shown, so that each in turn becomes operative under the action of the current, while the other is for the time being cut out or short-circuited. The claims are therefore directed to this broad principle of constructing a machine and connecting its circuits, and I do not limit myself to the specific form shown in the drawings.

Having thus described my invention, what I claim, and desire to secure by Letters Patent of the United States, is—

1. An electric motor for alternating currents having two independent armatures secured to a common spindle, independent field-magnets for said armatures, separate commutators for said armature-circuits, and separate pairs of brushes bearing on the latter, said brushes being connected to the same source of alternating currents, substantially as described.

2. An alternating-current motor having two armatures secured to a common spindle, but located in independent magnetic fields, said armatures being provided with collectors having alternate groups of segments connected to the armature-winding, the intermediate segments or groups of segments being connected to each other, substantially as described.

3. An alternating-current electric motor having two armatures with independent circuits secured to a common spindle, and commutators for each that have alternate groups of segments connected to the armature-winding, and intermediate segments that are connected together, said armatures being connected in series through their brushes to a single source of supply of alternating currents, the armatures and commutators being so placed upon their spindles with reference to their brushes that one armature is short-circuited by the connected segments of its commutator, while the other is supplied with current through the segments connected to its coils, substantially as described.

4. An alternating-current motor consisting of two independent armatures secured to a common spindle and electrically connected to independent field-magnets, the armature-circuits being connected in series with each other, and the independent field-magnet circuits connected likewise in series with each other and in parallel with the two armature-circuits to the same source of supply of alternating currents, substantially as described.

5. An alternating-current motor having two separate armatures secured to a common spindle and independent field-magnets for each of said armatures, the exciting-circuits of said armatures and field-magnets being connected in series multiple to the same source of alternating-current supply, substantially as described.

6. An alternating-current motor having two independent armatures and field-magnets, each field-magnet circuit being connected in parallel or shunt relation to its corresponding armature-circuit, which latter is provided with alternate segments or groups of segments that are connected to the armature-winding and intermediate segments or groups of segments that are connected together, whereby the field-magnet circuit being connected to the brushes is intermittently closed upon itself, substantially as described.

7. An alternating-current motor having separate independent field-magnets and armatures, the latter secured to a common spindle, the circuits of all being connected to the same source of alternating currents, the armatures being in series from brush to brush, and the separate field-magnet circuits being likewise in series with each other in a circuit taken as a shunt from the brush that conveys current into one armature around to the brush that conveys it out of the other, and a lead or bridge circuit one extremity of which is connected to the two remaining brushes and the other end to a point of the field-magnet circuit midway between the two separate field-magnet windings, substantially as described.

8. An alternating-current motor having separate independent field-magnets and armatures, the latter secured to a common spindle, the circuits of all connected to the same source of alternating currents, the armatures being in series from brush to brush, and the separate field-magnet circuits likewise in series with each other in a circuit taken as a shunt from the brush that conveys current into one armature around to the brush that conveys it out of the other, and a lead or bridge circuit one extremity of which is connected to the two remaining brushes and the other end to a point of the field-magnet circuit midway between the two separate field-magnet windings, in combination with commutators for said armatures, having alternate segments or groups of segments connected to the armature-winding, the intermediate segments being connected together, and these commutators being so placed with reference to their brushes that each armature in turn is short-circuited or cut out while the other is operative, substantially as described.

9. An alternating-current motor having separate independent field-magnets and armatures, the latter secured to a common spindle, the circuits of all being connected to the same source of alternating currents, the armatures being in series from brush to brush, and the separate field-magnet circuits likewise being in series with each other in a circuit taken as a shunt from the brush that conveys current into one armature around to the brush that conveys it out of the other, and a lead or bridge circuit one extremity of which is connected to the two remaining brushes and the other end to a point of the field-magnet circuit midway between the two separate field-magnet windings, in combination with commutators for said armatures having alternate segments or groups of segments connected to the armature-winding, the intermediate segments being connected together, and these commutators so placed with reference to their brushes that the exciting-circuit of each armature and its corresponding field-magnet is in turn short-circuited or cut out and the field-magnet circuit closed on itself through the intermediate connected segments of the commutator, substantially as described.

10. The method of operating electric motors on alternating-current circuits, which consists in connecting the operative circuits of two independent machines, the rotary parts of which are carried by a common spindle to a source of alternating current through commutators that short-circuit or cut out the exciting-circuits of each machine in turn during the period of time that the circuits of the other are excited by the current from the source of supply, substantially as described.

FRANCIS JARVIS PATTEN.

Witnesses:
 FRDK. ABAYUN, Jr.,
 CHAS. J. KINTNER.